July 12, 1966   M. H. GROVE   3,260,503
GATE VALVE CONSTRUCTION
Filed Nov. 9, 1964   3 Sheets-Sheet 1
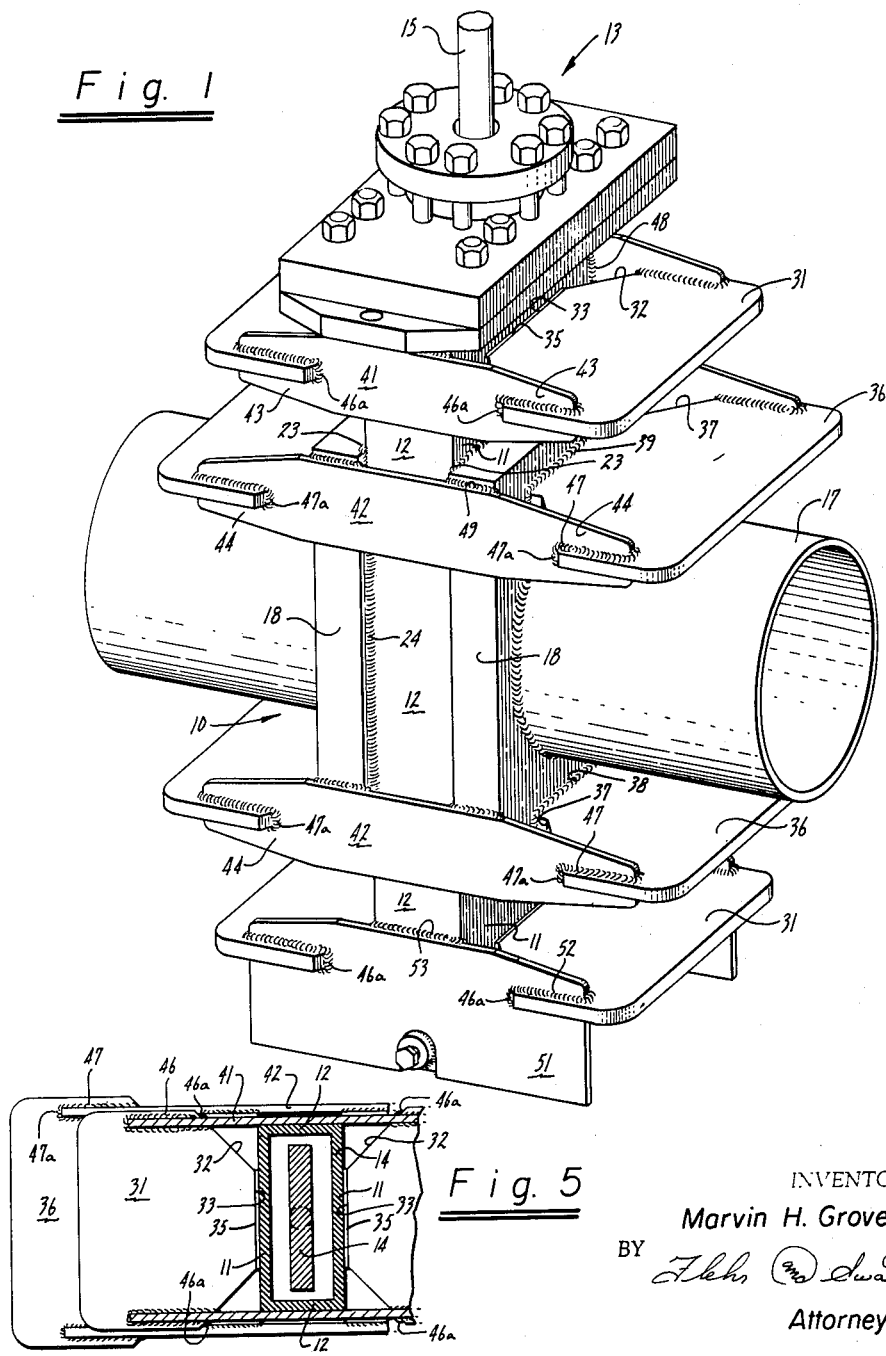
INVENTOR.
Marvin H. Grove
BY
Attorneys

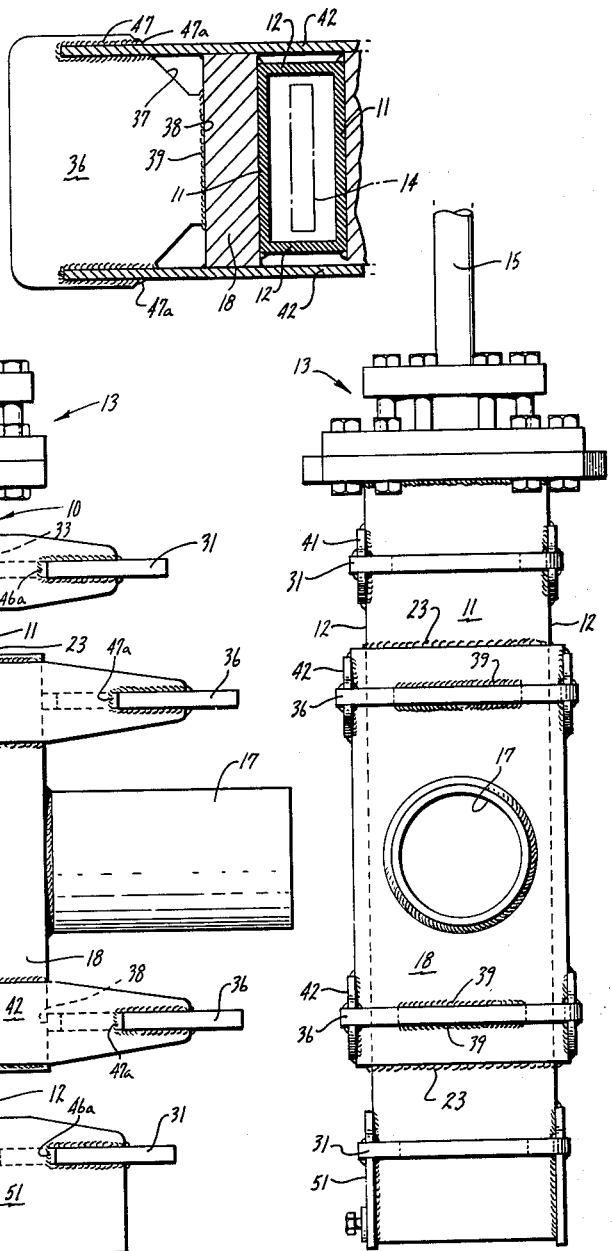

INVENTOR.
Marvin H. Grove
BY
Attorneys

3,260,503
GATE VALVE CONSTRUCTION
Marvin H. Grove, 340 Hillside Ave., Piedmont, Calif.
Filed Nov. 9, 1964, Ser. No. 409,710
6 Claims. (Cl. 251—329)

This application is a continuation-in-part of my copending application Serial No. 290,407, filed June 25, 1963, and now abandoned, which in turn was a continuation-in-part of my applications Serial No. 216,482, filed August 13, 1962, and now abandoned, and Serial No. 270,329, filed April 3, 1963, and abandoned.

The invention relates generally to valves of the gate type for controlling fluid flow.

In the past, the bodies of gate valves have been constructed from iron or steel castings, or by fabricating steel plates or other structural steel members. In the manufacture of fabricated valves, the body parts may be secured together as by clamping, bolting, or welding. The end walls of the body may be substantially flat whereby they require some reinforcement to prevent excessive outward deflection when used under the higher operating pressures. Assuming that hubs are mounted upon the end walls for making connection with associated piping, it may be necessary to make direct tie connections between the hubs to properly carry the stresses which may be applied by the associated piping.

As distinguished from valve bodies made from relatively heavy cast metals, the walls of fabricated bodies are subject to a certain amount of deflection under the operating pressures for which they are designed. It is common to reinforce such walls by welding on reinforcing ribs. In the application of such ribs, it is possible to produce stresses which may cause subsequent fracture of weld metal, or may not permit development of the strength indicated as being possible by stress calculations. Also, it is possible to apply the ribbing in such a manner that the desired strength to resist internal pressure is obtained at the expense of excessive weight.

An object of the present invention is to provide a novel gate valve construction having a relatively simple body which can be manufactured without difficulty and which has the necessary strength required.

A further object is to provide a novel fabricated valve wherein the parts of the valve body are secured together by welding, and wherein the body is characterized by the use of relatively heavy plate-like portions for connection with associated piping.

A further object of the invention is to provide a novel fabricated valve body construction which is adequately reinforced to resist internal pressure, and which does not afford excessive weight for a given size valve.

Another object is to provide a novel fabricated valve body construction for gate valves which will make possible economic manufacture for relatively large valves, as, for example, valves ranging from 12" to 42" pipe diameter.

Another object is to provide a fabricated valve body construction which does not have any undesirable stresses developed during fabrication by welding.

Additional objects and features of the invention will appear from the following description in which the preferred embodiment has been set forth in detail in conjunction with the accompanying drawings.

Referring to the drawings:

FIGURE 1 is a perspective view illustrating a gate valve made in accordance with the present invention;

FIGURE 2 is a side elevational view illustrating the gate valve body shown in FIGURE 1;

FIGURE 3 is an end view in elevation illustrating the valve shown in FIGURE 2;

FIGURE 4 is a cross-sectional view taken along the line 4—4 of FIGURE 2;

FIGURE 5 is a cross-sectional view taken along the line 5—5 of FIGURE 2;

Figure 6:
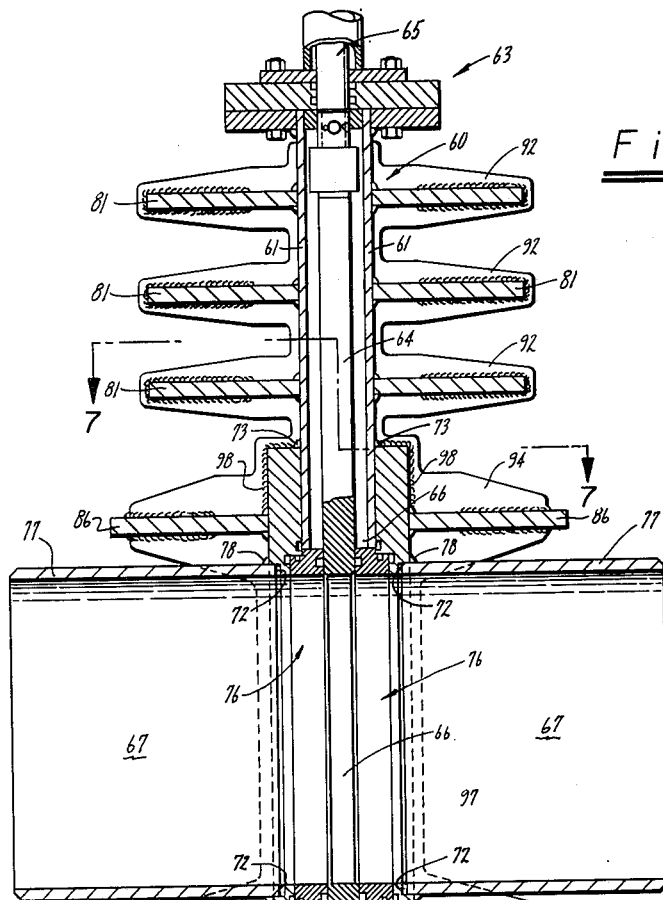
FIGURE 6 is a side elevational view in section illustrating another embodiment of the invention, the same being a valve body of the gate type.

The valve illustrated in FIGURES 1–3 of the drawing consists of a main body part 10 which in cross-section is substantially rectangular in configuration. Thus this body part consists of substantially flat end or front walls 11, connected at their edges to the side walls 12. This body part may be fabricated in any one of several ways. For example, it can be made of flat mill rolled steel plate cut to suitable sizes and welded at their edges, by two channels of suitable size welded together flange-to-flange, or by a channel of suitable size having a plate welded across its flanges. A bonnet assembly 13 is mounted upon the upper end of the main body part, and the other end is closed.

Within the main body part, there is a valve gate 14 which can be in the form of a flat plate or slab. One end of this gate is attached to the operating rod 15. The gate in this instance is shown provided with a port which is adapted to register with the flow passages 17.

Instead of equipping the main body part with the usual hubs, I provide a pair of relatively thick hub plates 18. These hub plates may be of suitable steel forgings, or may be torch-cut from relatively heavy steel plate. The thickness of each of these plates is many times the thickness of the walls 11, as is evident from FIGURES 1, 2 and 4. As viewed in end elevation (FIGURE 3) the portions 18 in this instance have a configuration which is substantially rectangular. The width of each plate 18 as viewed in FIGURE 3 is slightly greater than the width of the main body part 10. The length may be somewhat greater than its width.

In manufacturing and assembling the parts described above, the walls 11 are provided with aligned openings which register with openings in the hub plates 18. The hub plates 18 are then located upon the ends walls 11, with the openings in alignment and welds made entirely about the periphery of each plate 18 to secure the same to the main body part and to form an effective fluid tight seal. Thus as illustrated in FIGURE 1, welds 23 are shown between the upper and lower edges of each hub plate 18 and the corresponding adjacent body wall 11. Similarly, welds 24 (FIGURE 1) are applied between the corners of the main body part and the adjacent side edges of the hub plates 18.

Either before or after assembly, the hub plates 18 are suitably machined to provide recesses to accommodate annular sealing assemblies. Such assemblies make fluid tight contact with the side surfaces of the gate 14, and they are sealed with respect to the portions 18.

In instances where the valve is desired for relatively low pressure applications, no additional means may be required to reinforce the body against outward deflection of the walls against internal pressure. However, for the higher pressure services, reinforcing means is provided to reinforce the portions 18 against outward deflection and similarly reinforce the upper and lower margins of the hub plates 18. The reinforcing means illustrated for the end walls 11 consists of ribs 31 which can be torch cut from steel plate. The corner portions of these plates near the corners of the main body part are cut away as indicated at 32 (FIGURES 1 and 4). The portion 33 of each rib is in abutment with the adjacent end wall 11. Such abutment can be established by a weld connection or by an interposed strip 35 or nonmetallic material, such as Teflon. Some slight deformation of this strip under compression serves to establish effective seating of the edge of the rib on wall 11. The hub plates 18 are shown similarly reinforced by ribs 36. These ribs (FIGURES 1 and 5) likewise have their corners cut away as indicated at 37, and the portion 38 of each rib is secured by welding 39 to the adjacent part of the portion 18. It will be noted that ribs 36 extend parallel to the ribs 31 and are disposed transversely of the body intermediate the upper and lower edges of the plates 18 and the openings in these plates.

The ends of the ribs of each pair are secured together by means extending across the sides of the body. The means illustrated in FIGURES 1–5 consists of steel plates 41 and 42 which are torch cut to the configuration shown. This configuration provides tapered extensions 43 and 44 which preferably are slotted or bifurcated as shown and which are secured to the adjacent extremities of the corresponding ribs by welding 46 and 47. In the application of weld metal the welding can be carried out first in the regions 46a and 47a whereby when such weld metal cools shrinkage tends to pre-tension the end walls of the body and the plates 18. In other words the pre-tension causes force to be applied through the ribs to walls 11 and plates 18. Such force also applies some pre-compression to strip 35 to provide effective seating on wall 11 and to retain the strip in place.

If desired, the plates 41 and 42 may be made integral. The plates 41 are shown attached to the corners of the body by weld connections 48, and the plates 42 are shown attached to the ends of plates 18 by weld connections 49. At the bottom end of the body, instead of using plates corresponding to the plates 41, I employ enlarged plates 51 which are bifurcated and attached to the ribs 31 by weld connections 52. Likewise, plates 51 are shown attached to the sides of the main body part by weld connections 53. It will be seen that plates 51 are shaped in such a manner that they form feet for the lower end of the body.

It will be evident that the construction described above provides a valve body which is relatively simple but which has adequate strength to withstand internal pressure. The hub plates 18 serve to reinforce the relatively thinner end walls of the main body part against outward deflection. At the same time these hub plates are secured attached to the portions of the main body part and to the side plates 41, 42 and 51. The body is effectively reinforced with respect to stresses applied by associated piping, and in addition it is effectively reinforced with respect to internal fluid pressure. When internal pressure is sufficiently high to cause some deflection of the ribs 31 or 36, such bending is accommodated by bending of the plates 41, 42 and 51, in the regions of these plates extending between the extremities of the ribs and the corresponding corners of the body. Thus welds associated with the ribs are not placed under shear and are not apt to fracture.

Figure 7:
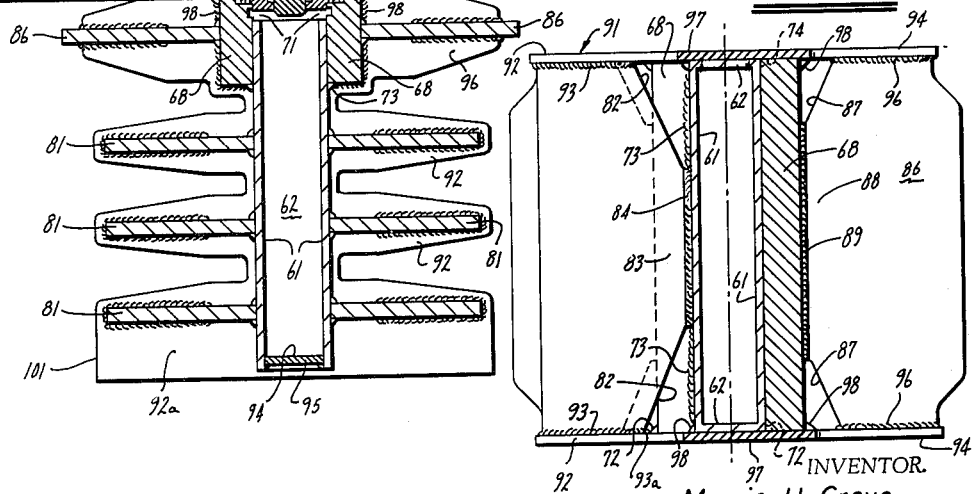
FIGURE 7 is a cross-sectional detail taken along the line 7—7 of FIGURE 6.

In the embodiment of the invention illustrated in FIGURES 6 and 7, the side plates are formed integral. Thus in this instance the main body part of the valve consists of the end plates 61, together with the side plates 62. A bonnet assembly 63 is carried by the upper end of the body, and the lower end of the body is closed. Within the main body part there is a valve gate 64 which can be in the form of a flat gate or slab. One end of this gate is attached to the operating rod 65. The gate in this instance is shown provided with port 66 which is adapted to register with the flow passages 17.

The hub plates 68 in this instance likewise have a rectangular configuration and have a width substantially the same as the width of the main body part. The walls 61 are provided with the aligned openings, and the hub plates 68 are provided with corresponding openings 72. The hub plates 68 are then located upon the end walls 61, with the openings in alignment, and welds made entirely about the periphery of each plate 68, to secure the same to the main body part and to form an effective fluidtight seal. Thus in FIGURE 6 welds 73 are shown between the upper and lower edges of each plate 68, and the corresponding adjacent body wall 61. Similarly, welds 74 (FIGURE 7) are applied between the corners of the main body part and the adjacent side edges of the hub plates 68. Either before or after assembly, the plates 68 can be machined to provide recesses which serve to accommodate the annular sealing assemblies 76. These sealing assemblies make sealing fluidtight contact with the side surfaces of the gate 64, and they are likewise sealed (as by means of an O-ring) with respect to the portions 68. Also in some instances the hub sections 77 may be secured to portions 68 by welding 78 to facilitate making weld connections with associated piping.

The reinforcing means shown in FIGURES 6 and 7 consists of ribs 81 which can be torch cut from steel plate. The corner portions of these plates near the corners of the main body part are cut away as indicated at 82 (FIGURE 7). The portion 83 of each rib is secured to the adjacent part of the end wall 61 by welding 84. The plate-like portions 68 are shown similarly reinforced by ribs 86. These ribs (FIGURE 7) likewise have their corners cut away as indicated at 87, and the portion 88 of each rib is secured by welding 89 to the adjacent part of the portion 68. It will be noted that ribs 86 extend parallel to the ribs 81 and are disposed transversely of the body intermediate the upper and lower edges of portions 68 and the openings 72 in these portions.

The ends of the ribs are secured together by means extending across the sides of the body. The means illustrated consists of steel plates 91 which may extend continuously for the entire length of the body. In the manufacture of these plates, they can be torch cut to configurations such as are shown in FIGURE 6. This configuration provides extensions 92 that are secured to the adjacent extremities of the corresponding ribs 81 by welding 93. Similar extensions 94 are secured to the adjacent extremities of the ribs 86 by welding 96. The intermediate portions 97 of the plates 91 may be slightly wider than the distance between the faces of the plate-like portions 68, and the margins of the portions 97 are secured to the adjacent edges of plate-like portions 68 by weld connections 98. Thus the plates 91 form a direct attachment between the side edges of the plate-like portions 68, thus reinforcing these portions against stresses applied to the same from associated piping. The portions of the plates 91 extending above and below the plate-like portions 68 can similarly be secured to the corners of the main body part by welding.

In the assembly process the ribs can be prestressed against the body by first applying weld metal in the regions 93a and 96a, and thereafter applying welds 93 and 96.

Although the plates 91 in FIGURE 6 extend the complete length of the body, it will be evident that they may be divided into a plurality of sections. For example, the plates can be interrupted between each pair of extensions 42, and they can be interrupted between the upper and lower edges of plate-like portions 68 and the adjacent extensions 92.

In the embodiment of FIGURES 1–5 one pair of ribs is provided for the upper body part, and similarly one pair is provided for the lower body part. In FIGURE 6, three pairs of ribs are provided for the upper body part, and a similar number for the lower part. It will be evident that the ribbing can be applied in accordance with the pressure requirements and in accordance with the strength of the walls forming the main body part.

In the embodiment of FIGURE 6, supporting feet are provided somewhat similar to the supporting feet provided in the embodiment of FIGURES 1–5. Thus as shown in FIGURE 6, the lower extensions 92a of the plates 91 are shaped to form feet 101.

Various expedients can be used to close the body of the main body part. In this instance, a bottom closure wall 94 is provided which is secured to the adjacent body walls by welding 95.

It will be evident that the construction described above provides a valve having a body that is relatively simple but which has adequate strength. The two hub plates 68 serve to reinforce the relatively thinner end walls of the main body part against outward deflection. At the same time these plate-like portions are securely attached to the corners of the main body part and to the side plates 91. An additional feature is that these plate-like portions are machined to receive the sealing assemblies 76. The machining to accommodate the sealing assemblies is not in proximity with the weld connections to the walls 61.

For a valve of a given size and pressure rating, my construction provides maximum economy with respect to weight. Manufacture and assembly is relatively simple, requiring a minimum amount of machining and a minimum amount of welding during fabrication. The body is effectively reinforced with respect to stresses applied by associated piping, and in addition it is reinforced with respect to internal pressure. Where the internal pressure is sufficiently high to cause some bending of the reinforcing ribs, such bending is accommodated by bending of the side plates in the regions of these plates extending between the extremities of the ribs and the corresponding corners of the body. Thus welds associated with the ribs are not placed under shear and are not apt to fracture.

I claim:

1. In a gate valve construction a valve body formed of connected flat end and side metal walls and being substantially rectangular in cross-section, aligned openings formed in the end walls forming flow passages, relatively thick hub plates disposed on opposite sides of the body in juxtaposition with the exterior surfaces of said end walls, the hub plates having openings aligned with the openings in the end walls and having a thickness substantially greater than the thickness of the end walls, the side edges of said hub plates being of substantial length and terminating substantially in a plane coincident with the exterior surfaces of the side walls, weld connections between the perimeter edges of said hub plates and said end walls thereby securing and sealing said hub plates with respect to the end walls, metal reinforcing ribs extending across and secured by welding to the exterior faces of said hub plates and disposed in parallel planes perpendicular to the longitudinal axis of the body, a plurality of additional metal reinforcing ribs extending laterally across and in abutment with the end walls on opposite sides of the body, said last ribs being disposed in parallel planes perpendicular to the longitudinal axis of the body, and metal plate means disposed in juxtaposition with the exterior surfaces of the side walls of the body, said plate means having margins overlapping the side edges of the said hub plates and secured thereto by welding, said plate means also providing bifurcated portions extending at right angle to said ribs and in juxtaposition with the ends thereof, each of said ribs having its ends welded to the corresponding bifurcated portions, each of said ribs having a portion thereof adjacent its ends cut away whereby each end of each rib is spaced outwardly from the corresponding longitudinal corner of the body.

2. In a gate valve construction, a main body part formed of connected flat end and side walls joined to provide a main body part that is rectangular in section with four parallel longitudinally extending corners, aligned openings formed in the end walls, relatively thick rectangular hub plates disposed on opposite sides of the main body part, the hub plates having openings aligned with the openings in the end walls and having a thickness substantially greater than the thickness of the end walls, each of said hub plates being superposed over the exterior surface of the corresponding end wall and extending outwardly from the perimeter of the opening in the corresponding end wall, each of said plates having end edges extending across the adjacent end wall of the main body part and side edges extending adjacent and parallel to two longitudinal corners of the main body part, and welds formed between the end edges of each hub plate and the adjacent end wall of the main body part and also between the side edges and the adjacent longitudinal corners of the main body part, said welds forming a seal between each hub plate and the corresponding adjacent end wall, parallel plates disposed in close proximity with the exterior surfaces of the side walls of the body, and welds between said plates and the adjacent side edges of said hub plates.

3. In a gate valve, a main body part that is substantially rectangular in section and consisting of substantially flat parallel end walls joined at their longitudinal edges by side walls, the end walls having aligned openings therein for flow passages, at least one pair of reinforcing ribs extending laterally across the end walls on opposite sides of the body, flat side plates extending across the side walls of the body and beyond the outer faces of said end walls with the planes of their faces substantially parallel to the outer surfaces of said side walls, said side plates being directly attached to the extremities of the ribs and to said body, said ribs having edge portions disposed adjacent said end walls to resist outward deflection of the same, the ribs being perpendicular to the planes of the side plates and to the end walls of the body.

4. A valve body as in claim 3 in which the extremities of the ribs that are directly attached to the side plates are spaced from the longitudinal corners of the body.

5. A valve construction as in claim 4 in which said side plates are slotted to receive the extremities of the ribs and are welded thereto along the regions of the slots.

6. A valve construction as in claim 3 in which strips of deformable nonmetallic material are interposed between said rib portions and said end walls.

References Cited by the Examiner

UNITED STATES PATENTS

| 1,213,259 | 1/1917 | Redding | 251—329 X |
|---|---|---|---|
| 2,904,306 | 9/1959 | Bryant | 251—329 X |
| 2,957,492 | 10/1960 | Volpin | 251—327 X |
| 2,982,514 | 5/1961 | Bryant | 251—329 |
| 3,013,770 | 12/1961 | Anderson et al. | 251—329 |
| 3,176,956 | 4/1965 | Englart et al. | 251—329 |

FOREIGN PATENTS

| 874,231 | 4/1953 | Germany. |
|---|---|---|
| 1,002,580 | 2/1957 | Germany. |

M. CARY NELSON, *Primary Examiner.*

A. ROSENTHAL, *Assistant Examiner.*